United States Patent
Odenheimer et al.

(10) Patent No.: US 10,083,061 B2
(45) Date of Patent: Sep. 25, 2018

(54) CLOUD EMBEDDED PROCESS TENANT SYSTEM FOR BIG DATA PROCESSING

(71) Applicant: SAP SE, Walldorf (DE)

(72) Inventors: Jens Odenheimer, Karlsruhe (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 65 days.

(21) Appl. No.: 15/341,455

(22) Filed: Nov. 2, 2016

(65) Prior Publication Data

US 2018/0121236 A1 May 3, 2018

(51) Int. Cl.
*G06F 9/455* (2018.01)
*G06F 9/48* (2006.01)

(52) U.S. Cl.
CPC ........ *G06F 9/4843* (2013.01); *G06F 9/45558* (2013.01); *G06F 2009/45595* (2013.01)

(58) Field of Classification Search
CPC .................................................. G06F 9/4843
See application file for complete search history.

(56) References Cited

U.S. PATENT DOCUMENTS

| | | | |
|---|---|---|---|
| 9,182,951 B1* | 11/2015 | Ormerod | G06F 9/4494 |
| 2015/0112894 A1* | 4/2015 | Lingappa | G06F 17/30522 706/11 |
| 2017/0039487 A1* | 2/2017 | Naganuma | G06N 99/005 |

* cited by examiner

Primary Examiner — Sisley Kim
(74) Attorney, Agent, or Firm — Buckley, Maschoff & Talwalkar LLC

(57) ABSTRACT

A process owner platform may be associated with a cloud embedded big data application and may exchange information with a tenant service executor platform. The process owner platform may establish a process using a process tenant template, the process being associated with public and private data and transmit, to the remote tenant service executor platform, information including the public data (without including the private data). The process owner platform may then receive result data and a process state identifier and establish a virtual process such that it is associated with the public data, the private data, and the result data. The process owner platform may also execute control logic in accordance with the process state identifier to materialize the virtual process into a process or a process tenant template, and the materialized process or process tenant template may associated with the public data, the private data, and the result data.

21 Claims, 13 Drawing Sheets

CLOUD EMBEDDED PROCESS TENANT SYSTEM FOR BIG DATA PROCESSING

FIELD

Some embodiments are associated with process tenant systems. In particular, some embodiments describe a cloud embedded tenant system for big data processing.

BACKGROUND

One or more enterprises may want to process a relatively large amount of "big data," such as information associated with warehouse data, internet usage patterns, Internet of Things ("IoT") observations, life sciences information (e.g., genome and protein data), etc. In such areas, sub-domains have emerged to facilitate specific types of data processing. For example, one entity might process a portion of the data in one way while another entity is processing a different portion of the data in a different way. The re-integration of these sub-processes can be a time consuming, error-prone, and cumbersome task. Moreover, the approaches are not standardized (in part due to the intrinsic nature of the big data problem), which can make re-integration of processed data even more difficult.

It may therefore be desirable to provide systems and methods to facilitate coordination and management of data processing by various entities in an efficient and accurate manner.

SUMMARY OF THE INVENTION

According to some embodiments, systems, methods, apparatus, computer program code and means are provided to facilitate coordination and management of data processing by various entities in an efficient and accurate manner. In some embodiments, a process owner platform may be associated with a cloud embedded big data application and may exchange information with a tenant service executor platform. The process owner platform may establish a process using a process tenant template, the process being associated with public and private data and transmit, to the remote tenant service executor platform, information including the public data (without including the private data). The process owner platform may then receive result data and a process state identifier and establish a virtual process such that it is associated with the public data, the private data, and the result data. The process owner platform may also execute control logic in accordance with the process state identifier to materialize the virtual process into a process or a process tenant template, and the materialized process or process tenant template may associated with the public data, the private data, and the result data.

Some embodiments comprise: means for establishing, by a processor of a process owner platform associated with the cloud embedded big data application, a process using a process tenant template, the process being associated with public data and private data; means for transmitting, to a remote tenant service executor platform via a distributed communication network, information including the public data without including the private data; means for receiving, from the tenant service executor platform, result data and an associated process state identifier; responsive to said receipt, means for establishing a virtual process such that it is associated with the public data, the private data, and the result data; and means for executing control logic in accordance with the process state identifier to materialize the virtual process into one of a process or a process tenant template, wherein the materialized process or process tenant template is associated with the public data, the private data, and the result data.

In some embodiments, a communication device associated with a process owner platform exchanges information with a remote service executor platform. The information may be exchanged, for example, via public and/or proprietary communication networks.

Technical effects of some embodiments of the invention are improved and computerized ways to facilitate coordination and management of data processing by various entities in an efficient and accurate manner. With these and other advantages and features that will become hereinafter apparent, a more complete understanding of the nature of the invention can be obtained by referring to the following detailed description and to the drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more enterprises may want to process a relatively large amount of "big data," such as information associated with warehouse data, internet usage patterns, IoT observations, life sciences information (e.g., genome and protein data), etc. In such areas, sub-domains have emerged to facilitate specific types of data processing. For example, one entity might process a portion of the data in one way while another entity is processing a different portion of the data in a different way. The re-integration of these-sub processes can be a time consuming, error-prone, and cumbersome task. Moreover, the approaches are not standardized (in part due to the intrinsic nature of the big data problem), making re-integration of processed data even more difficult.

Consider, by way of example only, a life sciences enterprise that has very large public data sets (such as the human genome) and needs to perform specific, intensive calculations to produce a comparably small set of derived data (such as identified genes). Once the derived data is calculated, it may need to be re-combined with other data—wither the original public data or other derived entities—into the end-to-end process. At any time during this process, the enterprise may have artifacts that need to be either published in a controlled fashion or retained as private data. Some embodiments described herein may provide a way to "fork" or split the process and subsequently re-integrate results. Moreover, some embodiments may provide ways to control the intermediate artifacts.

For example, a large pharmaceutical company might want to develop a new drug for Alzheimer's disease. Such a task might involve the following process steps:

Sequencing of tissue samples (somatic and germline);
Identification of active/silenced genes;
Comparison of somatic and germline results;
Identification of possible pathway inhibitors;
Simulation of new novel pathway; and
Likelihood analysis.

Note that this process might not be completely performed by the research and development portion of the company. For example, when data is published it leaves the company. As another example, processes may go beyond the classical research and development realm, such as cost calculations, etc. If the researchers find a promising drug, further processes may apply that reference previous ones. All along these process chains, several different types of data need to be processed. Moreover, some of the data may need to be retained as private (e.g., due to legal or intellectual property reasons) while other data should be published.

Figure 1:
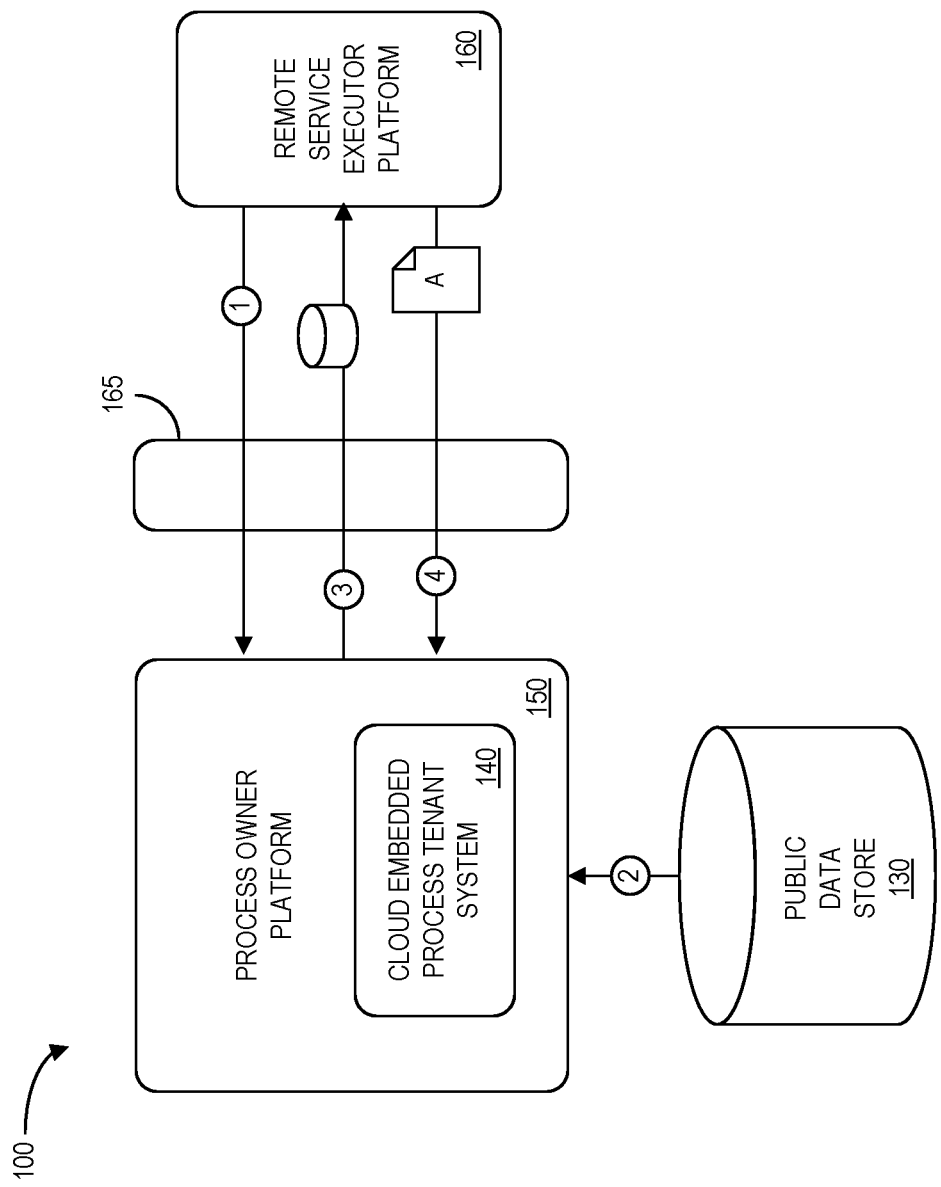
FIG. 1 is a high level block diagram of a computer system in accordance with some embodiments.

It may therefore be desirable to provide systems and methods to facilitate a semi-automatic reuse of data object information across applications and/or across application parts in an efficient and accurate manner. FIG. 1 is a high-level block diagram of a system 100 according to some embodiments of the present invention. In particular, the system includes a public data store 130 that provides information to a process owner platform 150. The process owner platform 150 may also exchange information with a remote service executor platform 160 (e.g., via a firewall 165). According to some embodiments, a cloud embedded process tenant system 140 executes at the process owner platform 150 to facilitate an accurate and efficient coordination and management of data processing among various entities. According to some embodiments, the process owner platform 150 and/or cloud embedded process tenant system 140 might be associated with a research institute or a third-party, such as a vendor that performs a service for an enterprise.

The process owner platform 150 might be, for example, associated with a Personal Computer ("PC"), laptop computer, smartphone, an enterprise server, a server farm, and/or a database or similar storage devices. According to some embodiments, an "automated" or "semi-automated" process owner platform 150 and/or cloud embedded process tenant system 140 may calculate information that is provided to the remote service executor platform 160. As used herein, the term "automated" may refer to, for example, actions that can be performed with little (or no) intervention by a human.

As used herein, devices, including those associated with the process owner platform 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such distributed communication networks.

The process owner platform 150 may store information into and/or retrieve information from the public data store 130. The public data store 130 might, for example, store a set of electronic records representing the human genome. The public data store 130 may be locally stored or reside remote from the process owner platform 150. As will be described further below, the public data store 130 may be used by the process owner platform 150 to automatically assign process tasks to one or more remote service executor platforms. Although a single process owner platform 150 is shown in FIG. 1, any number of such devices may be included. Moreover, various devices described herein might be combined according to embodiments of the present invention. For example, in some embodiments, the process owner platform 150 and public data store 130 might be co-located and/or may comprise a single apparatus.

According to some embodiments, the system 100 may automatically coordinate and management the execution of process tasks. For example, at (1) the remote service executor platform 160 might register with the process owner platform 150 and indicate that it is ready to perform one or more process tasks. At (2), the processor owner platform 140 may access information from the public data store 130 and transmit the information to the remote service executor 160 at (3). Note that the cloud embedded process tenant system 140 might help ensure that the process owner platform 150 does not unintentionally send private data to the remote service executor platform 160. The remote service executor platform 160 may then process the received data and return a result "A" to the process owner platform 150 at (4). Note that the service executor platform 160 might not need to return the public data (which might be relatively large) to the process owner platform 150 (which already has the data).

In some embodiments described herein, a computer system may include applications that are released and able to run on various combinations of database systems, Operating Systems ("OSs"), virtualization layers and cloud services, such as Infra-Structure as a Service ("IaaS") implementations. Moreover, embodiments might include real time analytics, interactive data exploration, and/or an application platform associated with, for example, the High-performance ANalytic Appliance ("HANA") in-memory, column-oriented, relational database management system developed and marketed by SAP SE®. Such an application platform might include, for example, an OnLine Analytical Processing ("OLAP") engine, a predictive engine, a spatial engine, application logic, a rendering platform, etc. A real-time data acquisition device may include landscape transformation, a replication server, and/or an event stream processor. According to some embodiments, an application platform and/or real-time data acquisition device may exchange information with transactional, analytical, online applications. An application platform may also exchange information with customer mobile applications (e.g., associated with mobile platforms), a business object suite (e.g., associated with exploration, reporting, dashboarding, predictive functions, and/or mobile versions), business objects data services, etc.

Figure 2:
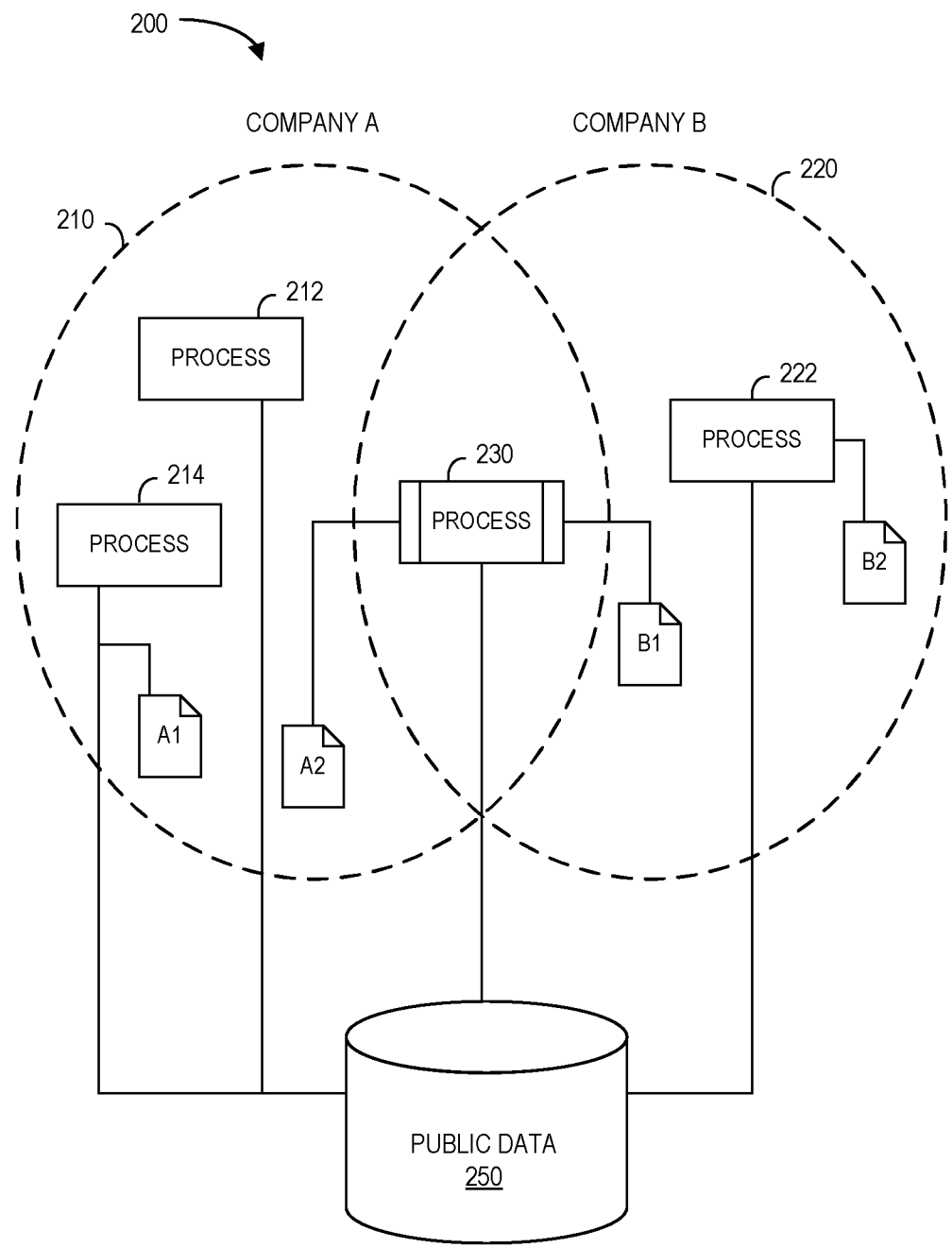
FIG. 2 illustrates shared and private data and processes in accordance with some embodiments.

The end-to-end process described with respect to FIG. 1 can be very long and complex and is typically handled by a large number of processors—such as those associated with other internal departments, outsourced sub-contractors, public research institutions, etc. Every entity in this scenario might have knowledge artifacts (research results or tools) that should either be published or kept private. Thus, FIG. 2 illustrates shared and private data and processes 200 in accordance with some embodiments. Note that as used herein, the term "process" might refer to either an atomic sub-process or a larger, more complex process. As illustrated in FIG. 2, company A 210 and company B 220 might be associated with different departments within a single company, two distinct companies, a company and a research institute, etc. Note that in an end-to-end process, some sub-processes may be outsourced to other parties. The process will typically require data, which might be public or private data. In the case of private data, the information may belong to company A 210 or company B 220 and, depending on contractual relations between company A 210 and company B 220, it might or might not need to be shared. Thus, FIG. 2 includes public data 250, processes 212, 214 and data A1, A2 associated with company A 210, process 222 and data B1, B2 associated with company B 220, and a process 230 that is associated with both company A 210 and company B 220. Note that in some embodiments, both company A 210 and company B 220 reside in a private cloud, a public cloud, or some mixture of both.

Figure 3A:
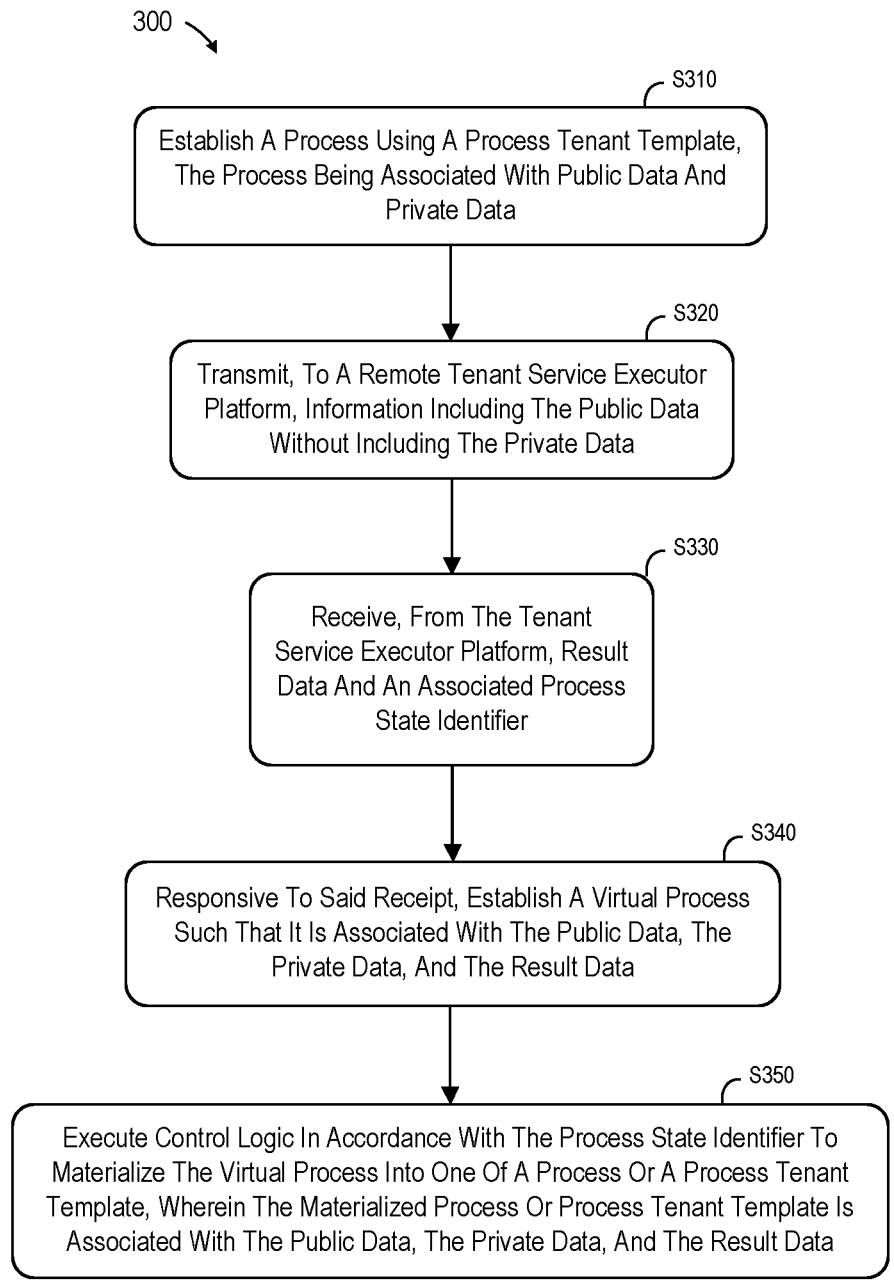
FIG. 3A is a flow diagram of a process owner method according to some embodiments.

Note that the system 100 of FIG. 1 is provided only as an example, and embodiments may be associated with additional elements or components. According to some embodiments, the elements of the system 100 automatically support the semi-automatic reuse of data object information. FIG. 3A illustrates a process owner platform method 300 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a processor of a process owner platform associated with a cloud embedded big data application may establish a process using a process tenant template, the process being associated with public data and private data. At S320, the processor may transmit, to a remote tenant service executor platform via a distributed communication network, information including the public data without including the private data. At S330, the processor may receive, from the tenant service executor platform, result data and an associated process state identifier. Responsive to said receipt, at S340 the processor may establish a virtual process such that it is associated with the public data, the private data, and the result data. The processor may then execute control logic in accordance with the process state identifier to materialize the virtual process into one of a process or a process tenant template, wherein the materialized process or process tenant template is associated with the public data, the private data, and the result data.

Figure 3B:
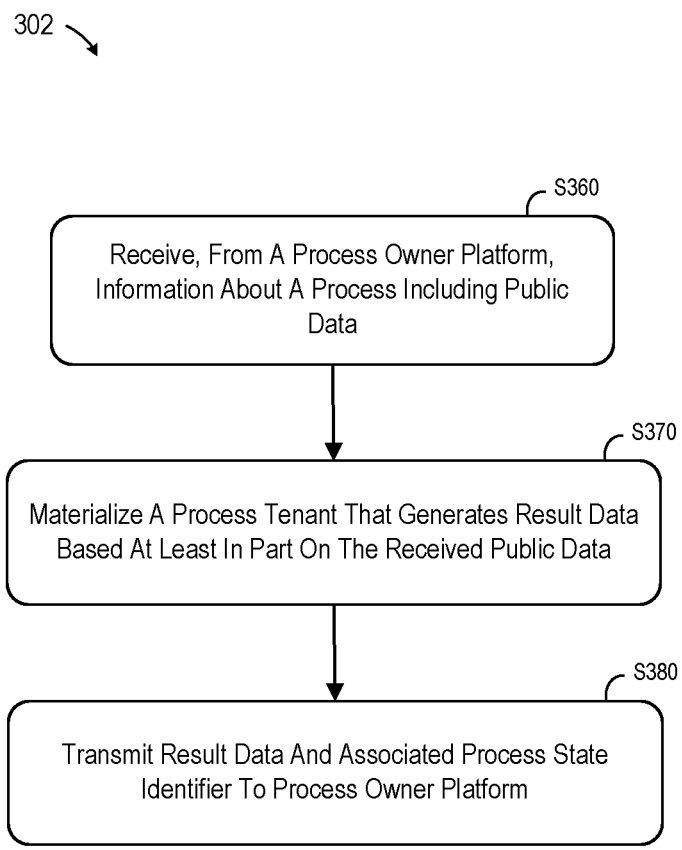
FIG. 3B is a flow diagram of a tenant service executor method in accordance with some embodiments.

FIG. 3B illustrates a tenant service executor platform method 302 that might be performed by some or all of the elements of the system 100 described with respect to FIG. 1, or any other system, according to some embodiments of the present invention. At S360, a processor of a tenant service executor platform may receive, from a process owner platform, information about a process including public data (but not including private data). At S370, the processor may materialize a process tenant that generates result data based at least in part on the received public data. At S380, the processor may transmit the result data and an associated process state identifier to the process owner platform (which can then re-integrate the result data with other information as appropriate).

Figure 4:
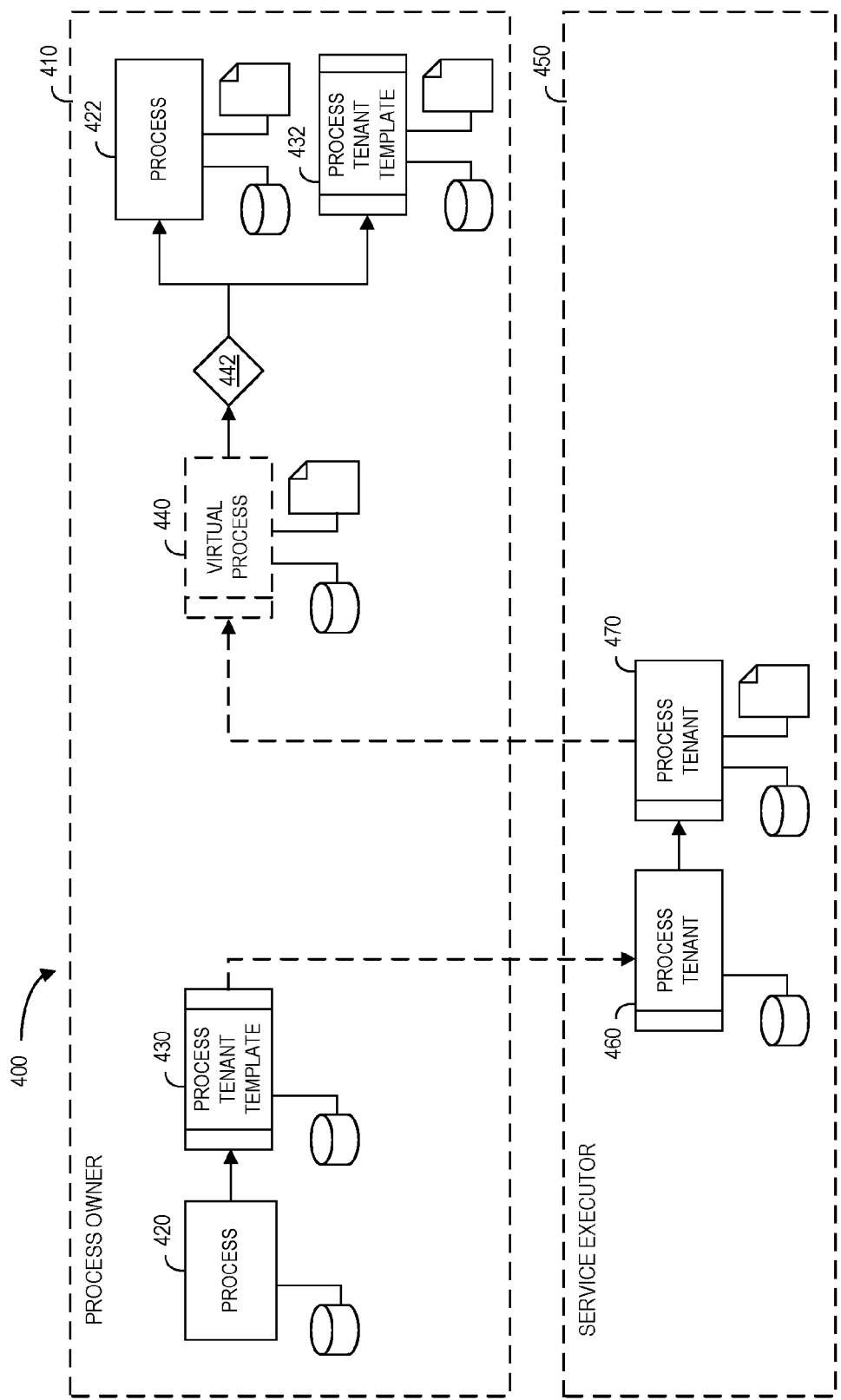
FIG. 4 is an example of a process tenant scenario in accordance with some embodiments.

FIG. 4 is an example of a process tenant scenario 400 in accordance with some embodiments. The scenario 400 includes a process owner 410 and a service executor 450. For example, the process owner 410 might represent a large company and the service executor 450 might be associated with an outsourced service. Then, at some point, a process 420 needs to be handed over (either with or without private data). A process 420 that is to be handed over is defined as a process tenant template 430 (in the realm of the process owner 410). The service executor 450 receives a materialization of the process tenant template as a process tenant 460 and then processes the data and derives some results at process tenant 470. In the illustrations herein, public data is visualized as a cylinder icon and private data is visualized as a document icon (a paper with a folded over corner).

Note that the results may be context sensitive and thus the services executor 450 cannot only pass back the results, but must also include a process state identifier. The finished sub-process with the corresponding results are sent back to the process owner 410. If a process goes back and forth between the process owner 410 and the service executor 450, a process state identifier may let the service executor 410 navigate to previous process steps. In the realm of the process owner 410, the returned process is a virtual process 440. This means that the process owner 410 is aware of the service completion and must to decide whether the virtual process 440 is materialized as a normal process 422 or as another process tenant template 432 based on control logic 442 (e.g., including rule-based logic, administrator inputs, etc.).

As used herein, the term "process" may refer to, for example, a collection of steps that process data. A process may contain private or public data. A process may live in either the realm of the process owner 410 or on the realm of the service executor 450. As used herein, the phrase "process tenant template" may refer to, for example, an abstraction of a process that may be passed on to a service executor. A process tenant template may contain private or public data. A process tenant template lives only in the realm of the process owner 410. As used herein, the phrase "process tenant" may refer to, for example, a materialization of a process tenant template. A process tenant may contain private or public data. A process tenant lives only in the realm of the service executor 450. As used herein, the phrase "virtual process" may refer to, for example, a virtual process is a returned process tenant. A virtual process may contain public or private data. A virtual process lives only in the realm of the process owner 410. A virtual process may be materialized into a process or a process tenant template.

Figure 5:
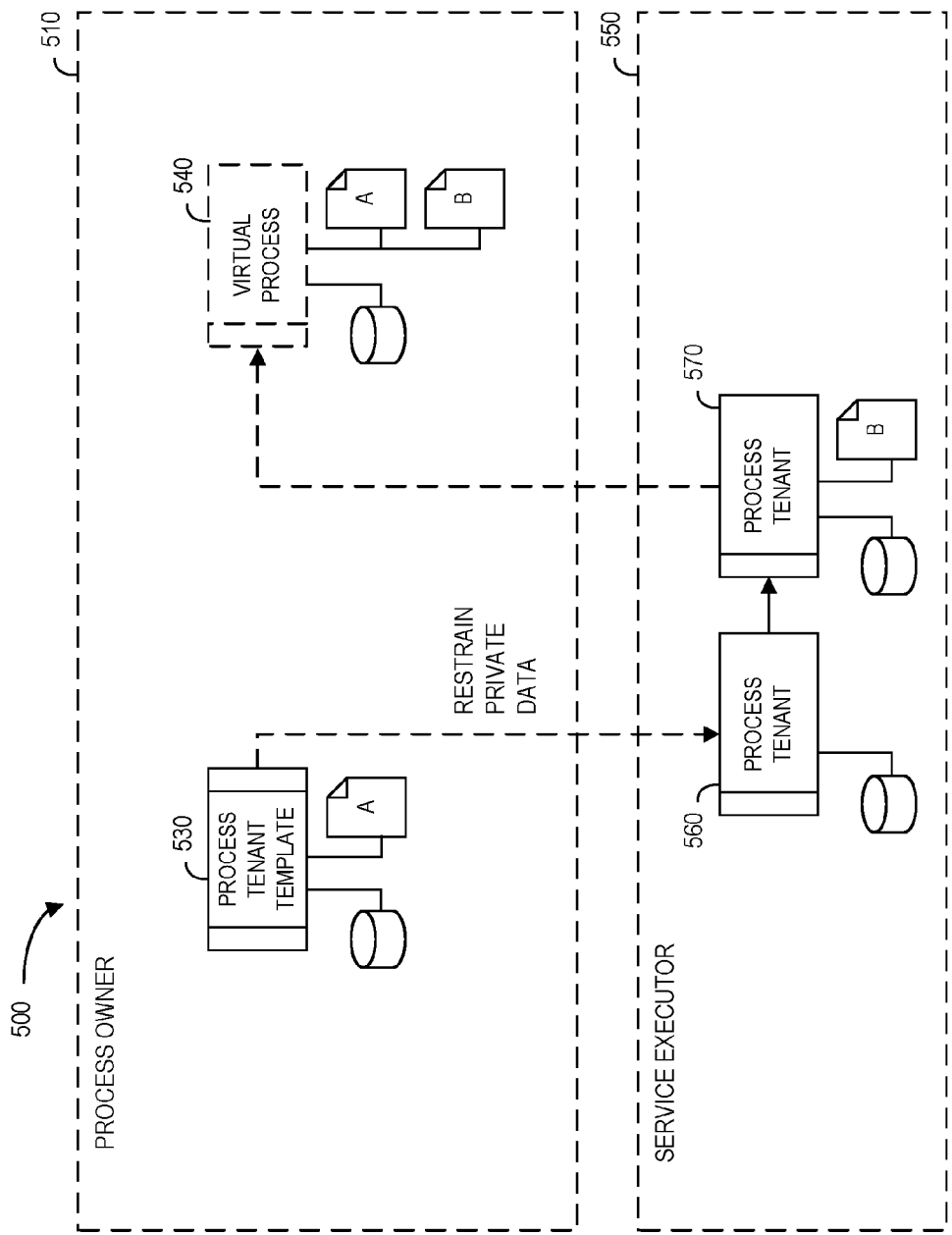
FIG. 5 is an example where private data is restrained according to some embodiments.

FIG. 5 is an example 500 where private data is restrained according to some embodiments. As before, a process owner 510 exchanges information with a service executor 550. A process tenant template 530 includes both public data and private data (A). In this case, the service executor 550 has a process tenant 560 that receives the public data but is not aware of the private data (A). Instead, the service executor 550 completes its service only using the public data source. A result of the process is generated by a process tenant 570 as derived data (B). The finished process along with the derived data (B) is passed back to the service owner 510. Note that the public data is not explicitly passed back—only the reference to public data. In the realm of the process owner 510, the process is virtual 540 until the process owner 510 decides how the virtual process 540 will be materialized.

Figure 6:
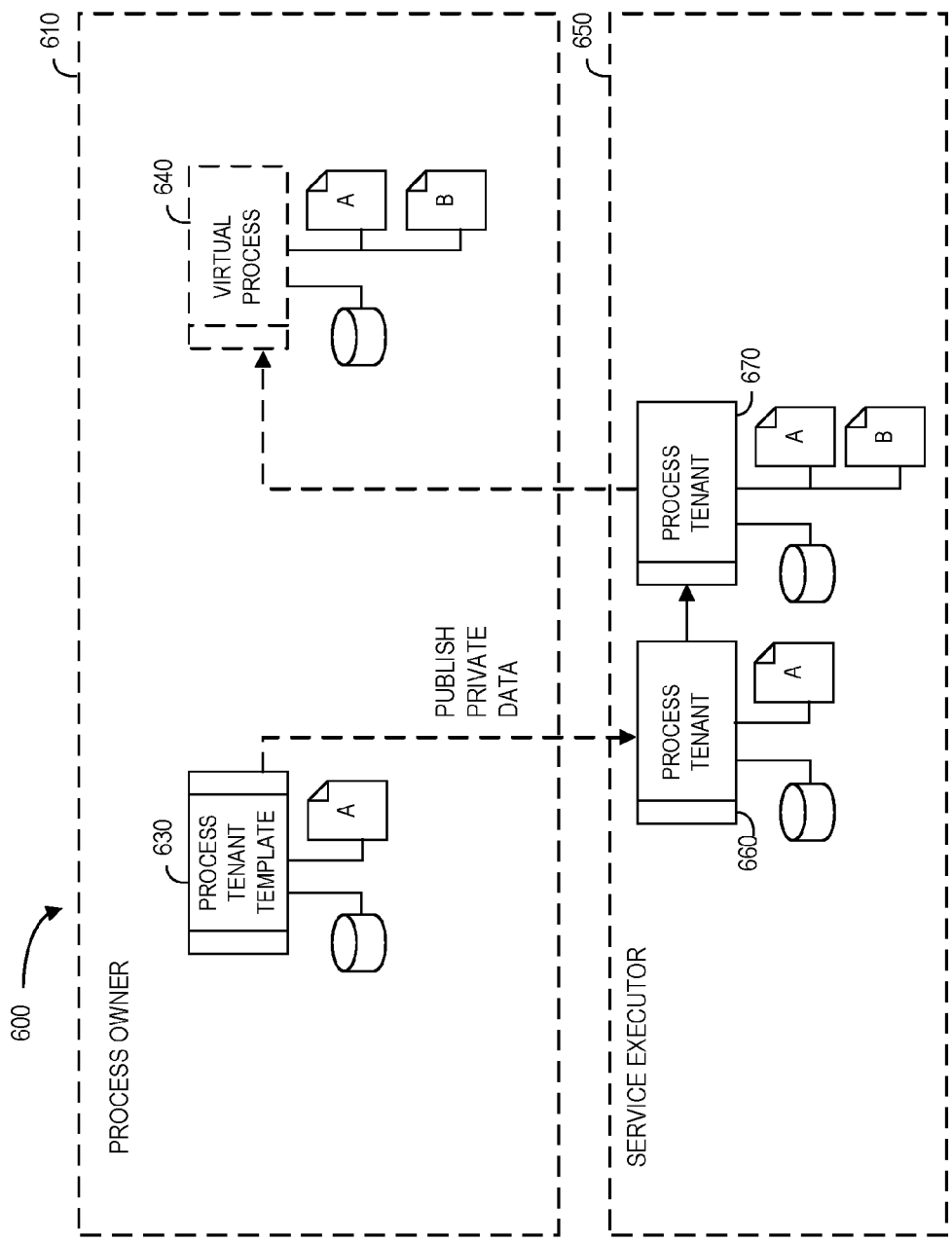
FIG. 6 is an example where private data is published in accordance with some embodiments.

FIG. 6 is an example 600 where private data is published in accordance with some embodiments. As before, a process owner 610 exchanges information with a service executor 650. A process tenant template 630 includes both public data and private data (A). In this case, the service executor 650 has a process tenant 660 that receives a copy of the public data and the private data (A) (e.g., it may need the private data along with the public data to complete the service. The result of the process is generated by a process tenant 670 as the derived data (B). The finished process along with the derived data (B) is passed back to the service owner 610. Note that neither the public data nor the private data (A) is explicitly passed back—only the reference to public data. In the realm of the process owner 610, the process is virtual 640 until the process owner 610 decides how the virtual process 640 will be materialized.

Figure 7:
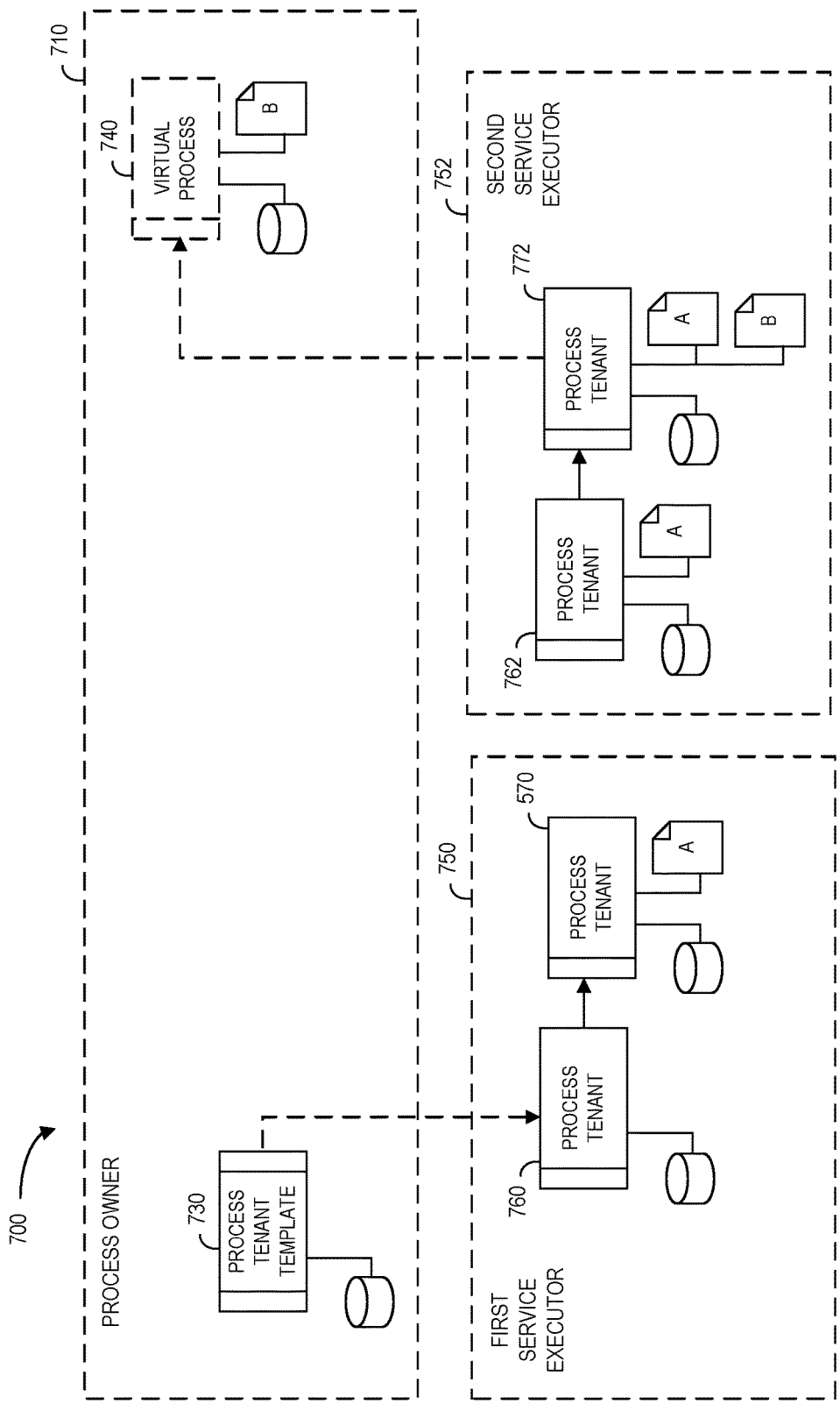
FIG. 7 is an example including multiple service executors according to some embodiments.

FIG. 7 is an example 700 including multiple service executors according to some embodiments. As before, a process owner 710 exchanges information with a first service executor 750. In this example, however, there is also a second service executor 752. A process tenant template 670 includes public data. Moreover, the first service executor 750 has a process tenant 760 that receives a copy of the public data. The result of the process is generated by a process tenant 770 as the derived data (A). The finished process along with the derived data (A) is passed to a process tenant 762 in the second service executor 752. Note this might be done via the process owner 710 or instead be passed directly from the first service executor 750 to the second service executor 752. The result of the process is generated by a process tenant 772 as the derived data (B). In this example, the second service executor 752 considers the data (A) to be private while the data (B) will be reported to the process owner 710 (although any other configuration may be employed in accordance with embodiments described herein). In the realm of the process owner 710, a process with data (B) is virtual 740 until the process owner 710 decides how the virtual process 740 will be materialized.

Figure 8:
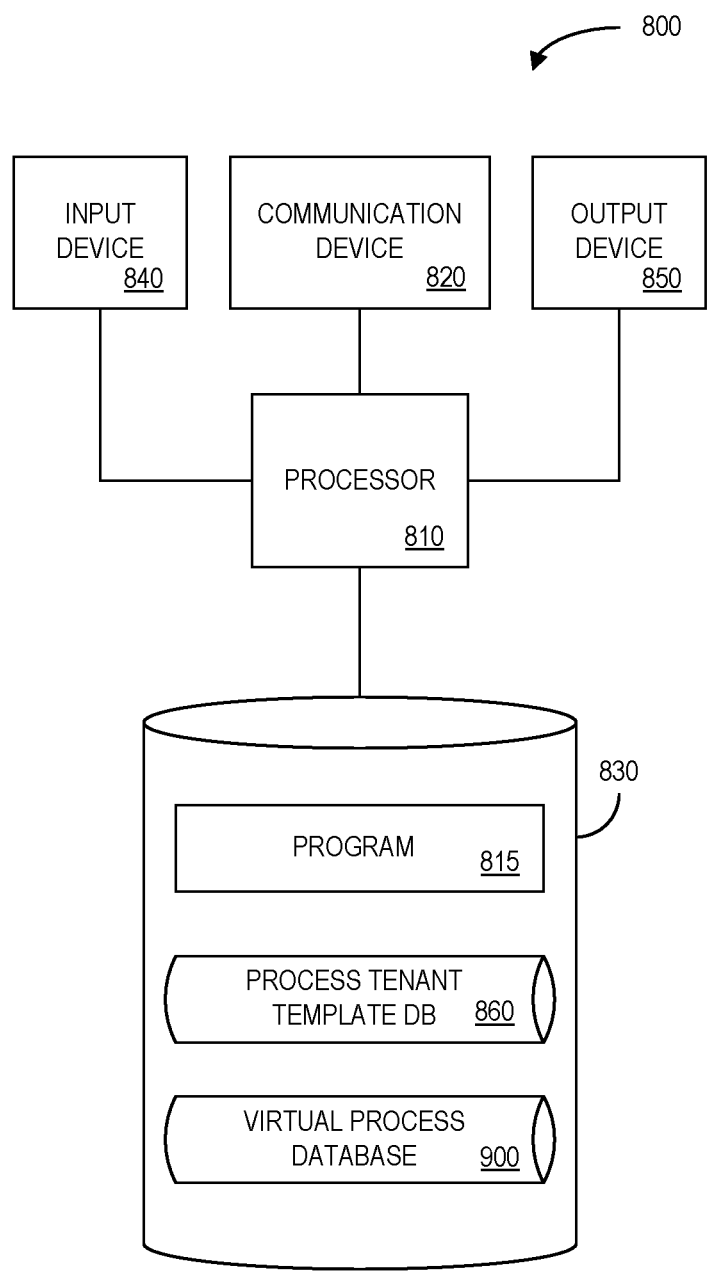
FIG. 8 is a high level diagram of an apparatus or platform in accordance with some embodiments.

Embodiments described herein may comprise a tool or platform that coordinates and managements the execution of a series of process tasks by multiple entities. For example, FIG. 8 illustrates a process owner apparatus or platform 800 that may be, for example, associated with the system 100 of FIG. 1. The platform 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more remote user devices (e.g., PCs and smartphones). Note that communications exchanged via the communication device 820 may utilize security features, such as those between a public internet user and an internal network of the insurance enterprise. The security features might be associated with, for example, web servers, firewalls, and/or PCI infrastructure. The platform 800 further includes an input device 840 (e.g., a mouse and/or keyboard to enter information about service executors, template libraries, etc.) and an output device 850 (e.g., to output reports regarding process statuses and/or overall system performance).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 815 and/or an existing association review tool or application for controlling the processor 810. The processor 810 performs instructions of the program 815, and thereby operates in accordance with any of the embodiments described herein. For example, the processor 810 may be associated with a cloud embedded big data application and may exchange information with a tenant service executor platform. The processor 810 may establish a process using a process tenant template, the process being associated with public and private data and transmit, to the remote tenant service executor platform, information including the public data (without including the private data). The processor 810 may then receive result data and a process state identifier and establish a virtual process such that it is associated with the public data, the private data, and the result data. The processor 810 may also execute control logic in accordance with the process state identifier to materialize the virtual process into a process or a process tenant template, and the materialized process or process tenant template may associated with the public data, the private data, and the result data.

The program 815 may be stored in a compressed, uncompiled and/or encrypted format. The program 815 may furthermore include other program elements, such as an operating system, a database management system, and/or device drivers used by the processor 810 to interface with peripheral devices.

As used herein, information may be "received" by or "transmitted" to, for example: (i) the platform 800 from another device; or (ii) a software application or module within the platform 800 from another software application, module, or any other source.

In some embodiments (such as shown in FIG. 8), the storage device 830 further stores a process tenant template database 860 (e.g., associated with different types of processes, lists of processes, etc.) and a virtual process database 900. An example of a database that might be used in connection with the platform 800 will now be described in detail with respect to FIG. 9. Note that the database described herein is only an example, and additional and/or different information may be stored therein. Moreover, various databases might be split or combined in accordance with any of the embodiments described herein. For example, the process tenant template database 860 and/or virtual process database 900 might be combined and/or linked to each other within the program 815.

Figure 9:
FIG. 9 is a portion of a tabular virtual process database that might be provided according to some embodiments.

Referring to FIG. 9, a table is shown that represents the virtual process database 900 that may be stored at the platform 800 according to some embodiments. The table may include, for example, entries identifying virtual processes that may be managed by a process owner. The table may also define fields 902, 904, 906, 908, 910, 912 for each of the entries. The fields 902, 904, 906, 908, 910, 912 may, according to some embodiments, specify: a virtual process identifier 902, a virtual process name 904, a public data 906, private data 908, an assigned service executor 910, and a current status 912. The data object database 900 may be created and updated, for example, based on information electrically received from applications and/or users (e.g., via interactive graphical displays).

The data object identifier 902 may be, for example, a unique alphanumeric code identifying a virtual process being managed by a process owner and the virtual process name 904 might describe the tasks associated with the process. The public data 906 might include (or link to) information is to be shared with service executors while the private data 908 may contain (or link to) information that will not be shared with one or more service executors. The assigned service executor 910 might indicate a remote platform (e.g., associated with a vendor or research facility) and the current status 912 might indicate if the task is pending, complete, etc. For completed tasks, the process owner might execute control logic to transition the virtual process associated with the virtual process identifier 902 to a process or a process tenant template as appropriate.

Figure 10:
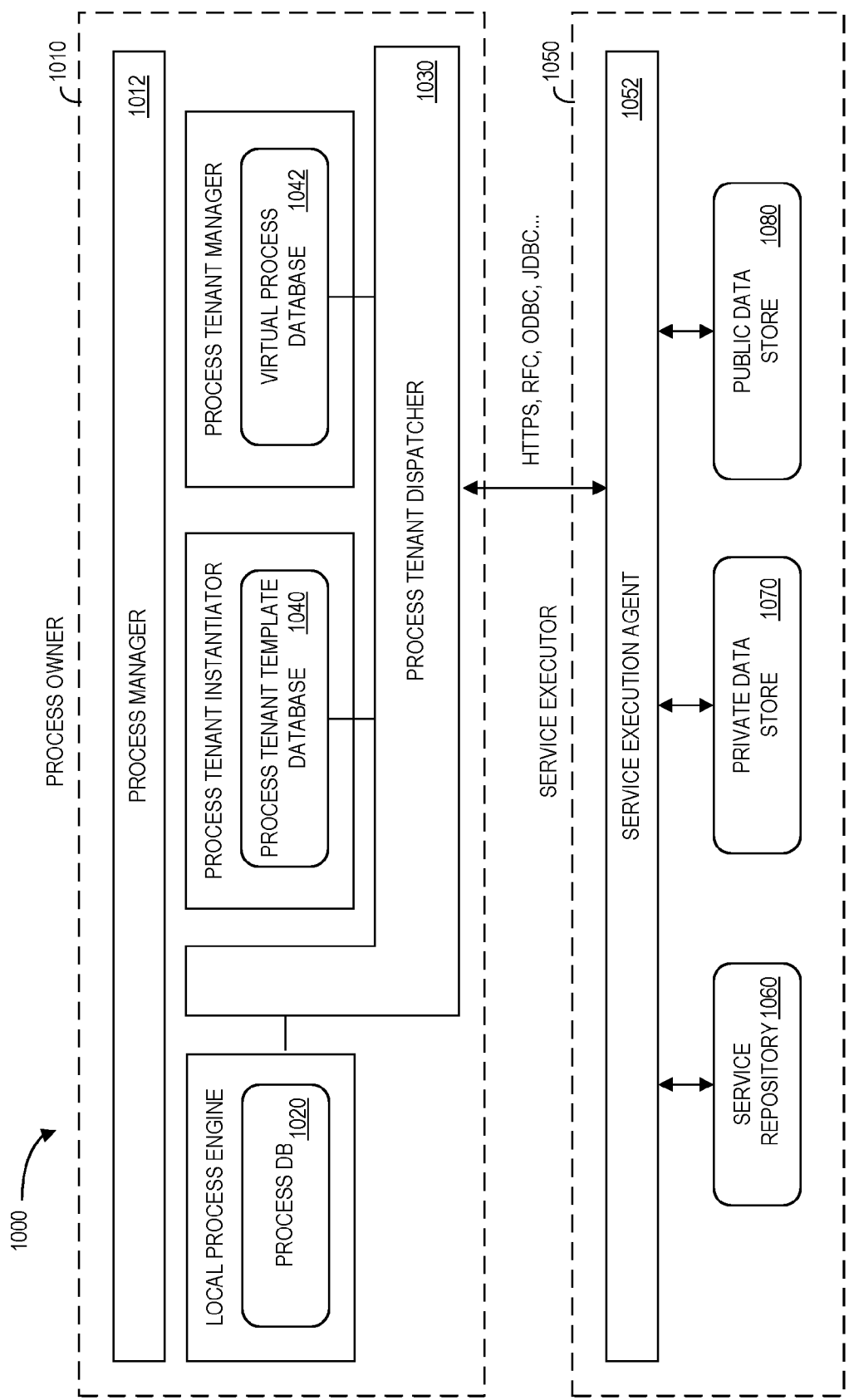
FIG. 10 is a more detailed system architecture diagram in accordance with some embodiments.

FIG. 10 is detailed system architecture diagram 1000 in accordance with some embodiments. The diagram 1000 includes a process owner 1010 that communicates with one or more service executors 1050. The process owner includes a process manager 1012 associated with an overall orchestration layer and a local process engine to handle the process steps which are executed within the realm of the process owner 1010 (e.g., storing a process database 1020 to store the local processes and the links to the virtual processes). The process owner also includes a process tenant instantiator (to takes care of the materialization of the process tenants) having a process tenant template database 1040 that contains all the templates that may be instantiated. A process tenant manager may provide an actual "virtual process tenant" entity and include a virtual process database 1042 containing all the current and past virtual process tenants (along with associated process state identifiers).

According to some embodiments, a process tenant dispatcher may handle communications with the service executor 1050 (e.g., via Hypertext Transfer Protocol Secure ("HTTPS") data, Remote Function Call ("RFC") exchanges, an Open Database Connectivity ("ODBC") interface, a Java Database Connectivity ("JDBC") interface, etc.) and map the process tenants to the virtual process tenants. Furthermore, the process tenant dispatcher 1030 may link the virtual process tenants to the local processes of the process owner. In particular, the process tenant dispatcher 1030 might communicate with the service executor 1050 via a service execution agent 1052 associated with the orchestration layer on the service executor 1050 side. The service execution agent 1052 may handle process tenants and map private and public data correctly. According to some embodiments, the service execution agent 1052 exchanges information with a service repository 1969 (containing all of the current and past process tenants and associated process state identifiers), a private data store 1070 (containing private data for the process tenants), and/or a public data store 1080 (that contains or links to public data).

Thus, embodiments may enable an efficient process and data exchange between different players in the field of life science research (although embodiments are not limited to that field). Moreover, a framework for end-to-end process collaboration may allow for the distinction between private and public data at any intermediate step. Embodiments may allow for the controlled publishing of process artifacts and/or the continuous treatment and protection of private data. Such an approach may greatly simplify cooperation between companies or between a large company and a smaller research institute.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

Figure 11:
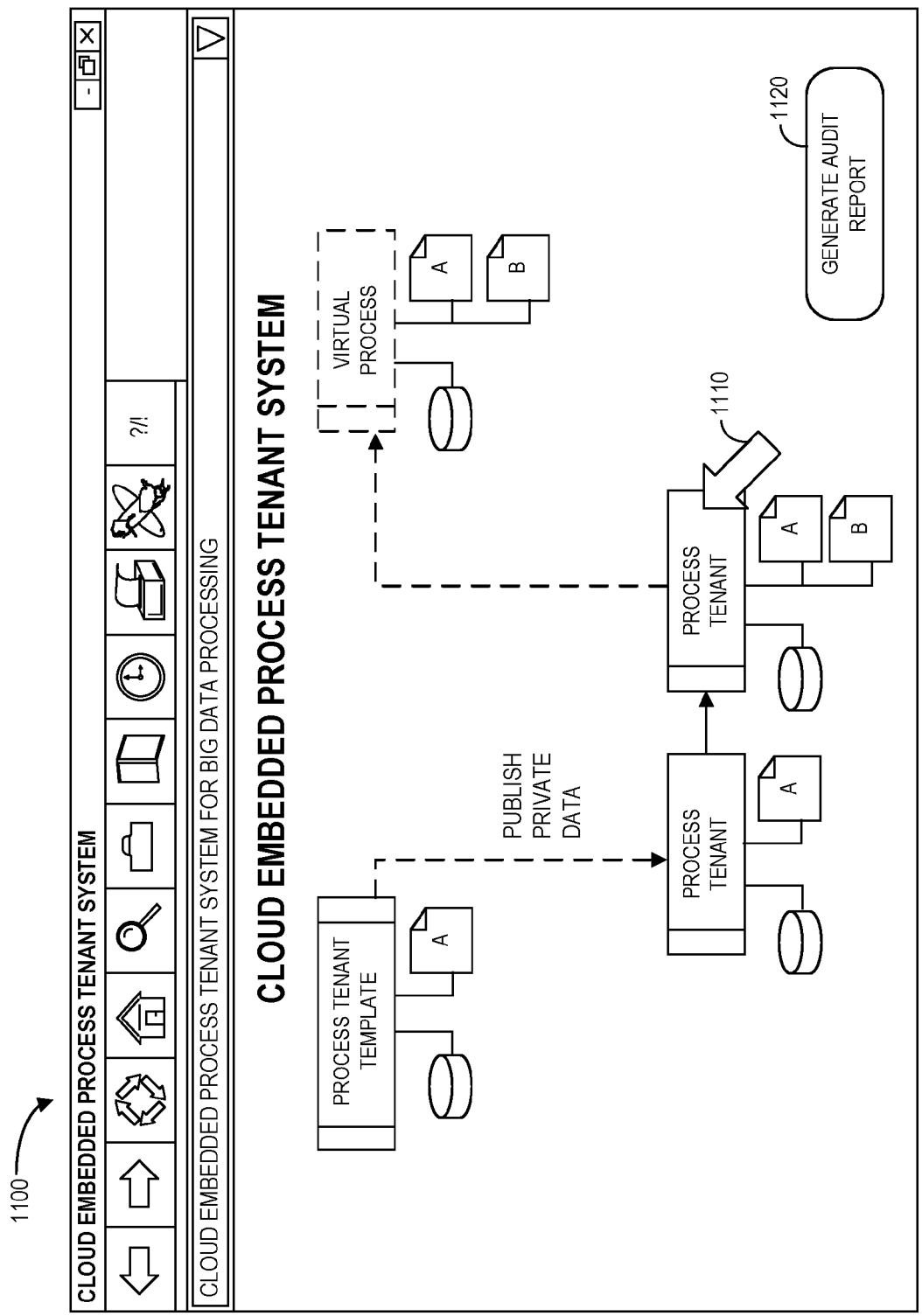
FIG. 11 illustrates a graphical user interface display that might be provided according to some embodiments.

FIG. 11 illustrates a graphical user interface display 1100 that might be provided according to some embodiments. In particular, the display 1100 includes a visual representation of a process flow (including, for example, tasks at both a process owner and a service executor). Moreover, selection of a graphical element via a computer pointer 1110 may result in, for example, a pop-up window displaying further details about the associated task, allow for administrator modification of task characteristics (e.g., assigning a priority to various tasks), etc. Moreover, selection of a graphical icon button 1120 might result in generation of an audit report (e.g., indicating when and where tasks were performs, when results were generated or modified, etc.), an export of data to other applications, information storage, etc.

Figure 12:
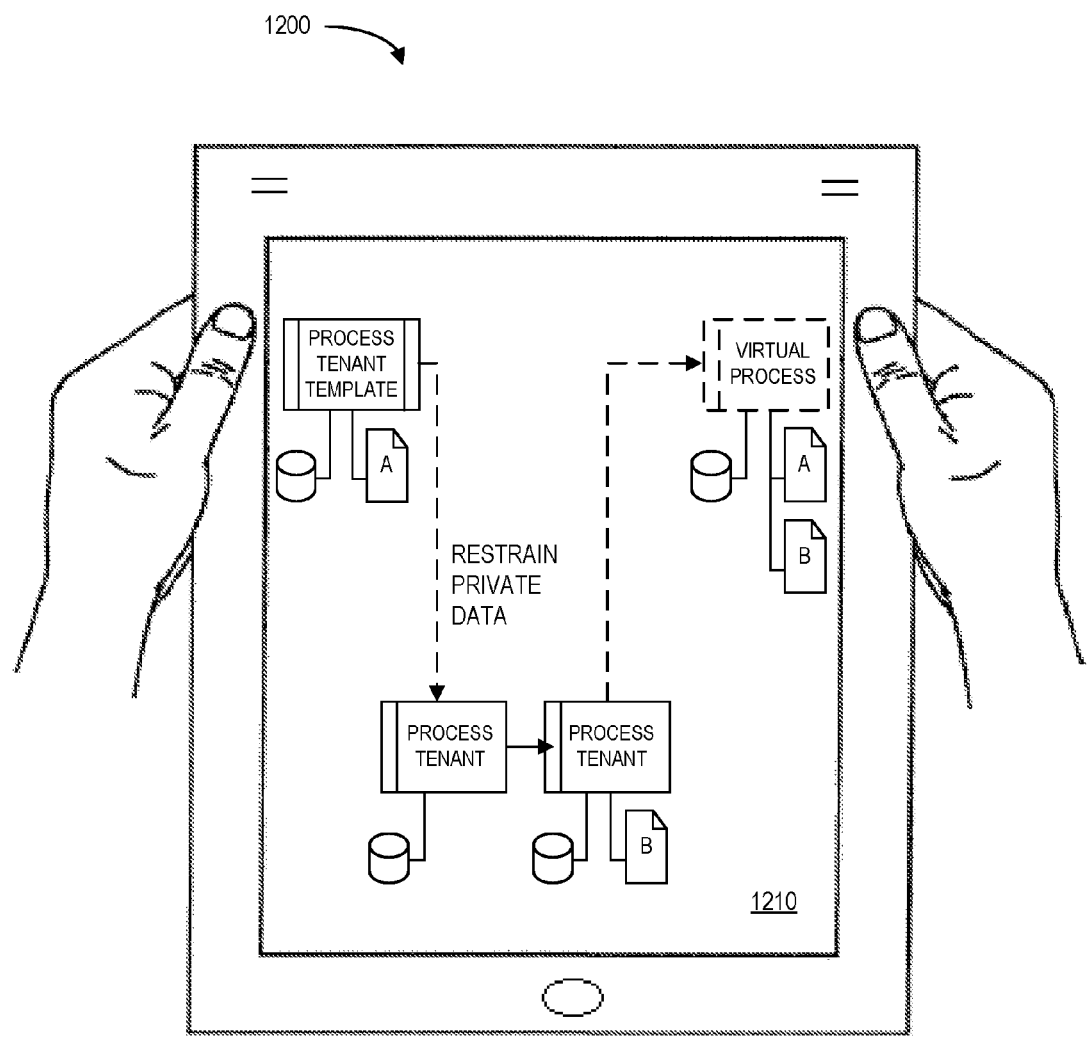
FIG. 12 illustrates a tablet or handheld computer being used according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of data structures and attribute characteristics, embodiments may instead be associated with other types of data (e.g., additional information might be collected and/or automatically generated about process tenant templates, virtual processes, etc.). Still further, the displays and devices illustrated herein are only provided as examples, and embodiments may be associated with any other types of user interfaces. For example, FIG. 12 illustrates a tablet or handheld computer 1200 being used according to some embodiments. In particular, the computer 1200 includes a display 1210 with a visual representation of a process flow (including, for example, tasks at both a process owner and a service executor). Moreover, selection of a graphical element via touch screen interface may result in, for example, a pop-up window displaying further details about the associated task, allow for administrator modification of task characteristics (e.g., assigning a priority to various tasks), etc.

Embodiments described herein are solely for the purpose of illustration. Those in the art will recognize other embodiments may be practiced with modifications and alterations to that described above.

What is claimed is:
1. A system, comprising:
 a process owner platform associated with a cloud embedded big data application, including:
  a process owner communication port to exchange information with a remote tenant service executor platform via a distributed communication network;
  a process owner memory storing processor-executable program code; and
  a process owner processor to execute the program code causing the process owner platform to:
   (i) establish a process using a process tenant template, the process being associated with public data and private data, wherein private data is data that is not published outside of the system,

(ii) transmit, to the remote tenant service executor platform, information including the public data without including the private data, (iii) receive, at a second remote tenant service executor platform from the remote tenant service executor platform, result data and an associated process state identifier, (iv) generate, by the second remote tenant service executor platform, a second result data, wherein the result data received from the remote tenant service executor platform is considered to be private while the second result data is transmitted to the process owner processor, (v) responsive to said receipt of said second result data, establish a virtual process such that it is associated with the public data, the private data, and the second result data, and (vi) execute control logic in accordance with the process state identifier to materialize the virtual process into one of a process or a process tenant template, wherein the materialized process or process tenant template is associated with the public data, the private data, and the result data.

2. The system of claim 1, further comprising:
the remote tenant service executor platform associated with the cloud embedded big data application, including:
a tenant service executor communication port to exchange information with the process owner platform,
a tenant service executor memory storing processor-executable program code, and
a tenant service executor processor to execute the program code causing the remote tenant service executor platform to materialize a process tenant that generates the result data based at least in part on the received public data.

3. The system of claim 2, wherein the process is associated with at least one of: (i) an atomic sub-process, and (ii) a collection of steps that process data.

4. The system of claim 2, wherein the process tenant template is an abstraction of the process that is executed by the remote tenant service executor platform.

5. The system of claim 2, wherein the remote tenant service executor platform further generates private results that are not published to the process owner platform.

6. The system of claim 2, wherein the result data is context sensitive.

7. The system of claim 2, wherein the process owner platform is further to generate an audit report.

8. The system of claim 2, wherein the process owner platform further includes:
a local process engine to handle the process steps which are executed within the realm of the process owner platform; and
a process database to store local processes and links to virtual processes.

9. The system of claim 8, wherein the process owner platform further includes:
a process manager associated with an overall orchestration layer.

10. The system of claim 9, wherein the process owner platform further includes:
a process tenant instantiator to materialize process tenants; and
a process tenant template database to store all of the templates that are instantiated.

11. The system of claim 10, wherein the process owner platform further includes:
a process tenant manager to provide a virtual process tenant entity; and
a virtual process database to store all current and past virtual process tenants along with process state identifiers.

12. The system of claim 11, wherein the process owner platform further includes:
a process tenant dispatcher to: (i) handle communication with the remote tenant service executor platform, (ii) map process tenants to virtual process tenants, and (iii) link virtual process tenants to local processes of the process owner platform.

13. The system of claim 2, wherein the remote tenant service executor platform further includes:
a service execution agent; and
at least one of: (i) a service repository to store current and past process tenants along with process state identifiers, (ii) a private data store containing private data for process tenants, and (iii) a public data store containing public data or links to public data.

14. A computer-implemented method associated with a cloud embedded big data application, comprising:
establishing, by a processor of a process owner platform associated with the cloud embedded big data application, a process using a process tenant template, the process being associated with public data and private data, wherein private data is data that is not published outside of a system:
transmitting, to a remote tenant service executor platform via a distributed communication network, information including the public data without including the private data;
receiving, at a second remote tenant service executor platform from the remote tenant service executor platform, result data and an associated process state identifier;
generating, by the second remote tenant service executor platform, a second result data, wherein the result data received from the remote tenant service executor platform is considered to be private while the second result data is transmitted to the process owner processor;
responsive to said receipt of said second result data, establishing a virtual process such that it is associated with the public data, the private data, and the second result data; and
executing control logic in accordance with the process state identifier to materialize the virtual process into one of a process or a process tenant template, wherein the materialized process or process tenant template is associated with the public data, the private data, and the result data.

15. The method of claim 14, wherein the process is associated with at least one of: (i) an atomic sub-process, and (ii) a collection of steps that process data.

16. The method of claim 14, wherein the process tenant template is an abstraction of the process that is executed by the remote tenant service executor platform, and the remote tenant service executor platform further generates private results that are not published to the process owner platform.

17. The method of claim 14, wherein the result data is context sensitive and the process owner platform is further to generate an audit report.

18. A non-transitory, computer-readable medium storing program code, the program code executable by a processor of a process owner platform, associated with a cloud embedded big data application, to cause the process owner platform to:
  establish a process using a process tenant template, the process being associated with public data and private data, wherein the private data is data that is not published outside of a system;
  transmit, to a remote tenant service executor platform via a distributed communication network, information including the public data without including the private data;
  receive, at a second remote tenant service executor platform from the remote tenant service executor platform, result data and an associated process state identifier;
  generate, by the second remote tenant service executor platform, a second result data, wherein the result data received from the remote tenant service executor platform is considered to be private while the second result data is transmitted to the process owner processor;
  responsive to said receipt of said second result data, establish a virtual process such that it is associated with the public data, the private data, and the second result data; and
  execute control logic in accordance with the process state identifier to materialize the virtual process into one of a process or a process tenant template, wherein the materialized process or process tenant template is associated with the public data, the private data, and the result data.

19. The medium of claim 18, wherein the process is associated with at least one of: (i) an atomic sub-process, and (ii) a collection of steps that process data.

20. The medium of claim 18, wherein the process tenant template is an abstraction of the process that is executed by the remote tenant service executor platform, and the remote tenant service executor platform further generates private results that are not published to the process owner platform.

21. The medium of claim 18, wherein the result data is context sensitive and the process owner platform is further to generate an audit report.

* * * * *